United States Patent
Brodie

(10) Patent No.: US 7,356,445 B2
(45) Date of Patent: *Apr. 8, 2008

(54) MEASUREMENT FAULT DETECTION

(75) Inventor: Keith Jacob Brodie, Irvine, CA (US)

(73) Assignee: SiRF Technology, Inc., San José, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/737,702

(22) Filed: Dec. 15, 2003

(65) Prior Publication Data

US 2004/0199833 A1    Oct. 7, 2004

Related U.S. Application Data

(63) Continuation of application No. 09/942,060, filed on Aug. 28, 2001, now Pat. No. 6,691,066.

(60) Provisional application No. 60/228,535, filed on Aug. 28, 2000.

(51) Int. Cl.
*G06F 15/00* (2006.01)
*G01C 21/00* (2006.01)

(52) U.S. Cl. ............... 702/185; 370/329; 701/215; 701/216; 702/59

(58) Field of Classification Search ............. 702/59, 702/97, 116, 183, 185, 190; 701/213, 215, 701/216; 342/357.02, 358; 370/329
See application file for complete search history.

(56) References Cited

U.S. PATENT DOCUMENTS

| | | | | |
|---|---|---|---|---|
| 4,766,549 A | * | 8/1988 | Schweitzer et al. | 702/59 |
| 5,202,829 A | * | 4/1993 | Geier | 701/215 |
| 5,416,712 A | * | 5/1995 | Geier et al. | 701/216 |
| 6,088,344 A | * | 7/2000 | Wales et al. | 370/329 |
| 6,691,066 B1 | * | 2/2004 | Brodie | 701/215 |

* cited by examiner

*Primary Examiner*—John Barlow
*Assistant Examiner*—John Le
(74) *Attorney, Agent, or Firm*—The Eclipse Group LLP.

(57) ABSTRACT

The present invention discloses a method and an apparatus for improving measurement fault detection in a sequential measurement processing estimator, and is particularly applied to Global Positioning Receivers.

12 Claims, 2 Drawing Sheets

MEASUREMENT FAULT DETECTION

REFERENCE TO EARLIER-FILED APPLICATIONS

This application is a continuation of U.S. patent application Ser. No. 09/942,060, filed Aug. 28, 2001, titled "Measurement Fault Detection," now issued as U.S. Pat. No. 6,691,066, which claims priority under Section 119(e) to U.S. Provisional Application Ser. No. 60/228,535, filed Aug. 28, 2000, each of which are incorporated into this application by reference.

BACKGROUND OF THE INVENTION

1. Field of the Invention

The present invention relates in general to the use of variable-gain filters, such as Kalman filters to estimate the state of a system, and in particular to improved measurement fault detection in such filters.

2. Description of the Related Art

The discrete time Kalman filter was introduced by Rudolf Kalman in a "A New Approach to Linear Filtering and Prediction Problems," in the Transactions of the ASME, Series D: Journal of Basic Engineering, Vol. 82, pp. 35-45 in 1960. The Kalman filter (KF) produces the state estimate with the smallest mean-square error for a linear time-invariant system with white, Gaussian state and measurement noise. The Kalman filter extended the concept of least-squares estimation to dynamic systems. The concept of least-squares estimation dates back to Gauss, at least. The Kalman filter has found innumerable applications in navigation, tracking, process control, parameter estimation, and other areas. It has been extended to include nonlinear state models, nonlinear measurement models, non-white state and measurement noise, and correlation between state and measurement noise.

A succinct description of the Kalman filter can be found in *Applied Optimal Estimation* by A. Gelb (ed.) from The MIT Press, 1974 pp. 1-179 which is herein incorporated by reference. A summary of the basic filter and some notes on the notation follow from Gelb. The notation to be used in the description is given in Table 1. A superscripted "T" after a matrix is the matrix transpose, and a superscripted "−1" after a matrix is it's inverse. Again following from Gelb, the discrete KF processing steps are given in Table 2. These steps advance the state estimate and it's associated error covariance matrix from one time to another.

TABLE 1

Notation for Kalman Filter Description

| | |
|---|---|
| $X_{t_1|t_2}$ | State vector estimate for the system at time $t_1$ using measurements up to and including those from time $t_2$. |
| $\Phi$ | State transition matrix |
| $Q$ | Process Noise Matrix |
| $R$ | Measurement Noise Covariance Matrix |
| $P_{t_1|t_2}$ | State error covariance matrix at time $t_1$ using measurements up to and including time $t_2$ |
| $Z$ | Measurement vector, a set of vector measurements for a given time. |

TABLE 1-continued

Notation for Kalman Filter Description

| | |
|---|---|
| $H$ | The measurement model matrix. This is the partial derivative of the measurement vector with respect to the state vector. |
| $I$ | The identity matrix |

TABLE 2

Five Discrete Kalman Filtering Processing Steps

| Step | Step Name | Step Processing |
|---|---|---|
| 1 | State Propagation | $X_{t+\Delta t|t} = \Phi X_{t|t}$ |
| 2 | Covariance Propagation | $P_{t+\Delta t|t} = \Phi P_{t|t}\Phi^T + Q$ |
| 3 | Gain Calculation | $K = P_{t+\Delta t|t}H^T(HP_{t+\Delta t|t}H^T + R)^{-1}$ |
| 4 | State Update | $X_{t+\Delta t|t+\Delta t} = X_{t+\Delta t|t} + K(Z - HX_{t+\Delta t|t})$ |
| 5 | Covariance Update | $P_{t+\Delta t|t+\Delta t} = (I - KH)P_{t+\Delta t|t}$ |

An implementation issue with the KF is the matrix inverse called for in step 3, the gain calculation, from table 2. Computing the inverse is often a substantial burden, particularly in a real-time system A common practice, therefore, has been to divide up the processing of the vector measurement (steps 3, 4, and 5 from Table 2) into a sequence of scalar measurement processing. If the measurement vector Z, has one element, in other words when we have a scalar measurement, the measurement derivative with respect to the state, H, is a row vector. In this case the gain calculation, step 3 from Table 2 above reduces to a division rather than a matrix inversion.

$$K = \frac{PH^T}{HPH^T + R}$$

If a measurement vector, Z, contains multiple elements, it can be partitioned into a set of scalar measurements. In the case of a diagonal measurement noise covariance matrix R, partitioning into scalar measurements is no more complicated than picking out the diagonal term from the matrix R, and processing it with the corresponding row of H and the corresponding element of the vector Z. This is generally referred to as sequential measurement processing. We can expand our notation to include sequential measurement processing such that $Z_A$, $Z_B$, . . . are elements of the original vector measurement Z; $H_A$, $H_B$, . . . are the corresponding rows of H; $R_A$, $R_B$, . . . are the corresponding diagonal elements of the noise covariance matrix. The sequential measurement processing KF then follows these steps. The gain and residual calculations have been broken out for discussion of the Chi-square test in subsequent paragraphs. The state and covariance notation has been augmented for sequential processing, such that $X_{t+\Delta t|t,A}$ is the state vector estimate for time $t+\Delta t$ given measurements up to time t and measurement A. This state, updated for measurement A, is the input state for steps 10 and 13 of measurement B processing, and so on.

TABLE 3

Discrete Sequential Kalman Filter Processing Steps

| Step | Repeated Steps | Step Name | Step Processing |
|---|---|---|---|
| 1 | | Stare Propagation | $X_{t+\Delta t|t} = \Phi X_{t|t}$ |
| 2 | | Covariance Propagation | $P_{t+\Delta t|t} = \Phi P_{t|t} \Phi^T = Q$ |
| Loop for each measurement: | 3, 9, 15 ... | Residual Variance | $\Gamma_A = H_A P H_A^T + R_A$ |
| | 4, 10, 16 ... | Residual | $\delta_A = Z_A - H_A X_{t+\Delta t|t}$ |
| A, B, C ... | 5, 11, 17 ... | Chi-Square test statistic | $\chi_A^2 = \dfrac{\delta_A^2}{\Gamma_A}$ |
| | 6, 12, 18 ... | Gain Calculation | $K_A = P_{t+\Delta t|t} H_A^T / \Gamma_A$ |
| | 7, 13, 19 ... | State Update | $X_{t+\Delta t|t,A} = X_{t+\Delta t|t} + K_A \delta_A$ |
| | 8, 14, 20 ... | Covariance Update | $P_{t+\Delta t|t,A} = (I - KH) P_{t+\Delta t|t}$ |

In the case where R is not diagonal, in other words the measurement noises are correlated, techniques may be used which transform the R matrix to diagonal form for easy partitioning. The necessary transformations are defined by G. Bierman in *Factorization Methods for Discrete Sequential Estimation*, Academic Press 1977, pp. 47-55 which is herein incorporated by reference.

It is possible to prove that the order in which a set of sequential measurements is processed in a linear system using the steps of Table 3 is irrelevant to the final state estimate. A simple one-dimensional example of this fact is given in Table 4. In Table 4, the two measurements are taken to be measurements of the state vector directly, thus H is a two-by-two identity matrix. The example is for the sequential measurement processing, not the state propagation, so it corresponds to steps 3 through 14 inclusive of Table 3. The Chi-square test in the example of Table 4, will be described subsequently. There are two processing columns in Table 4, one for measurement order A,B, and the other for B,A. While the intermediate steps are different, the final state and covariance estimates are the same. Thus, in the prior art, the order in which measurements from the same time have been processed in a sequential filter has been a matter of convenience, the measurements are processed in whatever order they are gathered from the measuring device or stored in memory, or some other mechanism.

TABLE 4

Single State KF Sequential Measurement Processing Example

| | | |
|---|---|---|
| State | Truth: X = 0 Estimate: $X_{t|t-\Delta t} = 1$ | |
| State Variance | $P_{t|t-\Delta t} = 1$ (state estimate correctly modeled) | |
| Measurement Model | $H_A = H_B = H = 1$ | |
| | $R_A = R_B = R = 1$ | |
| Measurements | $Z_A = -1$ (One sigma measurement, correctly modeled) | |
| | $Z_B = 2$ (Two sigma measurement, correctly modeled) | |
| Measurement Processing Order | A, B | B, A |
| First Measurement Residual Variance | $\Gamma_A = 1 + 1 = 2$ | $\Gamma_B = 1 + 1 = 2$ |
| First Measurement Residual | $\delta_A = Z_A - X_{t|t-\Delta t} = -2$ | $\delta_B = Z_B - X_{t|t-\Delta t} = 1$ |
| First Measurement Three Sigma Chi-Square Test | $(-2)^2 < (3^2 \cdot 2)$ ? Passed | $(1)^2 < (3^2 \cdot 2)$ ? Passed |
| First Measurement Gain | $K_A = P_{t|t-\Delta t}/\Gamma_A = 1/2$ | $K_B = P_{t|t-\Delta t}/\Gamma_B = 1/2$ |
| First Measurement State Update | $X_{t|t-\Delta t,A} = X_{t|t-\Delta t} + K_A \delta_A = 0$ | $X_{t|t-\Delta t,B} = X_{t|t-\Delta t} + K_B \delta_B = 3/2$ |
| First Measurement State Variance Update | $P_{t|t-\Delta t,A} = (1 - K_A)P_{t|t-\Delta t} = 1/2$ | $P_{t|t-\Delta t,B} = (1 - K_B)P_{t|t-\Delta t} = 1/2$ |
| Second Measurement Residual Variance | $\Gamma_B = \dfrac{1}{2} + 1 = \dfrac{3}{2}$ | $\Gamma_A = \dfrac{1}{2} + 1 = \dfrac{3}{2}$ |
| Second Measurement Residual | $\delta_B = Z_B - X_{t|t-\Delta t,A} = 2$ | $\delta_A = Z_A - X_{t|t-\Delta t,B} = -5/2$ |
| Second Measurement Three Sigma Chi-Square Test | $(2)^2 < \left(3^2 \cdot \dfrac{3}{2}\right)$ ? Passed | $\left(-\dfrac{5}{2}\right)^2 < \left(3^2 \cdot \dfrac{3}{2}\right)$ ? Passed |
| Second Measurement Gain | $K_B = P_{t|t-\Delta t,A}/\Gamma_B = 1/3$ | $K_A = P_{t|t-\Delta t,B}/\Gamma_A = 1/3$ |
| Second Measurement State Update | $X_{t|t} = X_{t|t-\Delta t,A} + K_B \delta_B = 2/3$ | $X_{t|t} = X_{t|t-\Delta t,B} + K_A \delta_A = 2/3$ |
| State Measurement State Variance Update | $P_{t|t} = (1 - K_B)P_{t|t-\Delta t,A} = 1/3$ | $P_{t|t} = (1 - K_A)P_{t|t-\Delta t,A} = 1/3$ |

One of the problems apparent to Kalman filter practitioners is that measurements are often generated by physical mechanisms which can result in measurement faults. These faults, by definition, are components of the measurement values that are not included in the measurement model. So, for example, if the measurement is a pseudorange measurement to a GPS satellite, and the direct ray to the satellite has been blocked but a reflected ray is tracked, the resulting measurement has a fault, errors that fall outside the model used to process the measurement. This condition is shown in FIG. 2. Measurement faults have at least two adverse affects; they corrupt the resultant estimate of the state, and their effects are not considered in the update of the error covariance matrix. After processing a measurement with a fault, the state error covariance matrix may no longer be an accurate representation of the state error.

This problem led to the development of Chi-square measurement fault detection, sometimes referred to as Chi-square residual testing or innovations variance testing. The purpose is to reject measurements that we believe have been corrupted by a fault, and therefore fall outside of our filter model. The test is a statistical hypothesis test for a random variable. The application of a Chi-square test to the measurement residual dates back, at least, to Mehra and Peschon [5] in a 1971 paper titled "An Innovations Approach to Fault Detection and Diagnosis in Dynamic Systems" in Automatica, Vol. 7, pp. 637-640, 1971.

The chi-square residual test is a test on the hypothesis that the measurement we are about to process is actually a member of the measurement set we have defined. We define the residual as:

$$\delta = Z - HX_{t+\Delta t|t}$$

The hypothesis is tested by forming the ratio of the observed residual to it's expected value, thus, for a scalar measurement.

$$\chi^2 = \frac{\delta^2}{HPH^T + R}$$

The test would be passed if the computed value of chi-squared is less than a threshold value. A typical threshold of nine, for example, would be a three sigma test on the measurement, meaning we would expect 99.7% of nor distributed measurements to pass the rest. So if the value $\chi^2$ computed above is greater than nine, we have detected a failure at the three sigma level. This test is well-known and in common practice.

Since the residual variance, $HPH^T + R$, is also part of the scalar gain calculation, the chi-square test is often conducted in the sequential processing of the scalar measurements. Referring back to Table 3, the residual variance has been computed in step 3, and the Chi-square test statistic was formulated in step 5. Thus the test is computed in-line with the sequential measurement processing. The example in Table 4 shows the application of the test, the ratio is computed and checked before the gain computation and the state update are completed for each measurement. A flow-chart of this process is given in FIG. 1.

The term Satellite Positioning System (SATPS) is used to define a satellite-based system transmitting ranging signals for use in navigation. Examples of SATPS include the Global Positioning System (GPS), the Russian GLONASS system, and the proposed European Galileo system. In all of these systems the receiver develops pseudorange measurements to the transmitting satellites by synchronizing a code replica with the transmitted satellite code. Doppler measurements, and integrated doppler measurements, may be made as well, with integrated doppler measurements commonly being referred to as delta-pseudorange measurements. Since the inception of the GPS, Kalman filtering has been a popular method for estimating the navigation state from the pseudorange and delta-pseudorange measurements. The paper "Aircraft Navigation with the Limited Operational Phase of the NAVSTAR Global Positioning System" by L. R. Kruczynski, in Global Positioning System, Volume 1, pp. 154-165, 1980 from the Institute of Navigation, from his 1977 conference paper, describes a Kalman filter used to process GPS measurements. In satellite positioning system measurement processing there is some prior art on measurement fault detection methodology. Much of this art is concerned with ad hoc attempts to define a measurement edit or weighting strategy to reduce the effects of multipath. In U.S. Pat. No. 5,883,595 by Colley, for example, a mechanism for de-weighting suspect measurements is disclosed based on the size of their residuals and an undisclosed reliability factor. In U.S. Pat. No. 5,590,043 by McBurney some adaptation of filter parameters on the basis of multipath presence is disclosed, but with no mechanism apparent for detection of the multipath. The existence of these methods indicates the relative lack of success of unaltered Chi-square residual thong at least in the field of satellite navigation, and calls out the need for improved measurement detection and editing.

It can be seen then, that there is a need in the art for improved measurement fault detection in state estimation. It can also be seen that there is a need in the art for improved multipath detection in satellite positioning system receivers.

SUMMARY OF THE INVENTION

To minimize the limitations in the prior art, and to minimize other limitations that will become apparent upon reading and understanding the present specification, the present invention discloses a method and apparatus for improving measurement fault detection in a sequential measurement processing estimator.

An object of the present invention is to provide for improved measurement fault detection in state estimation. Another object of the present invention is to provide for improved multipath detection in satellite positioning receivers.

DETAILED DESCRIPTION OF THE DRAWINGS

In the following description of the preferred embodiment, reference is made to the accompanying drawings which form a part hereof, and in which is shown by way of illusion a specific embodiment in which the invention may be practiced. It is to be understood that other embodiments may be utilized and structural changes may be made without departing from the scope of the present invention.

Overview

Figure 1:
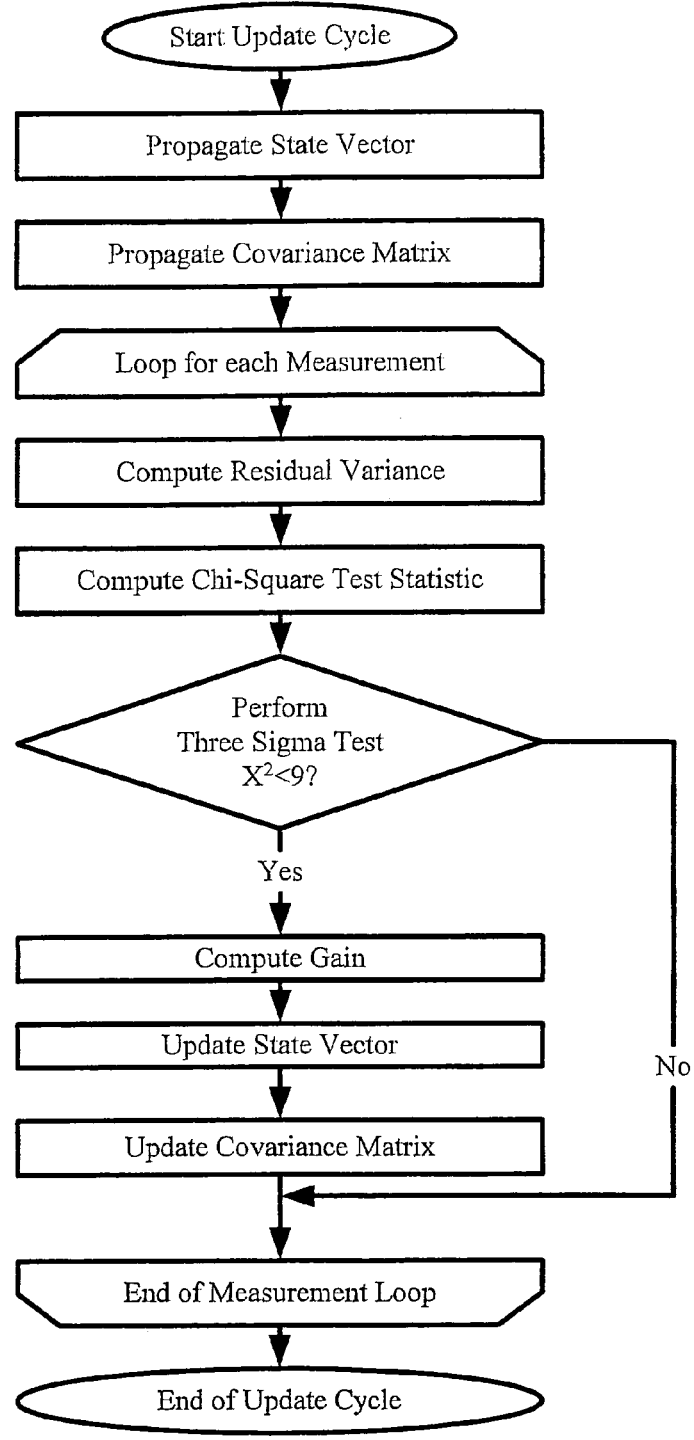
FIG. 1 is a flow-chart of a generic sequential measurement processing system for a Kalman filter with Chi-square residual testing.
Figure 2:
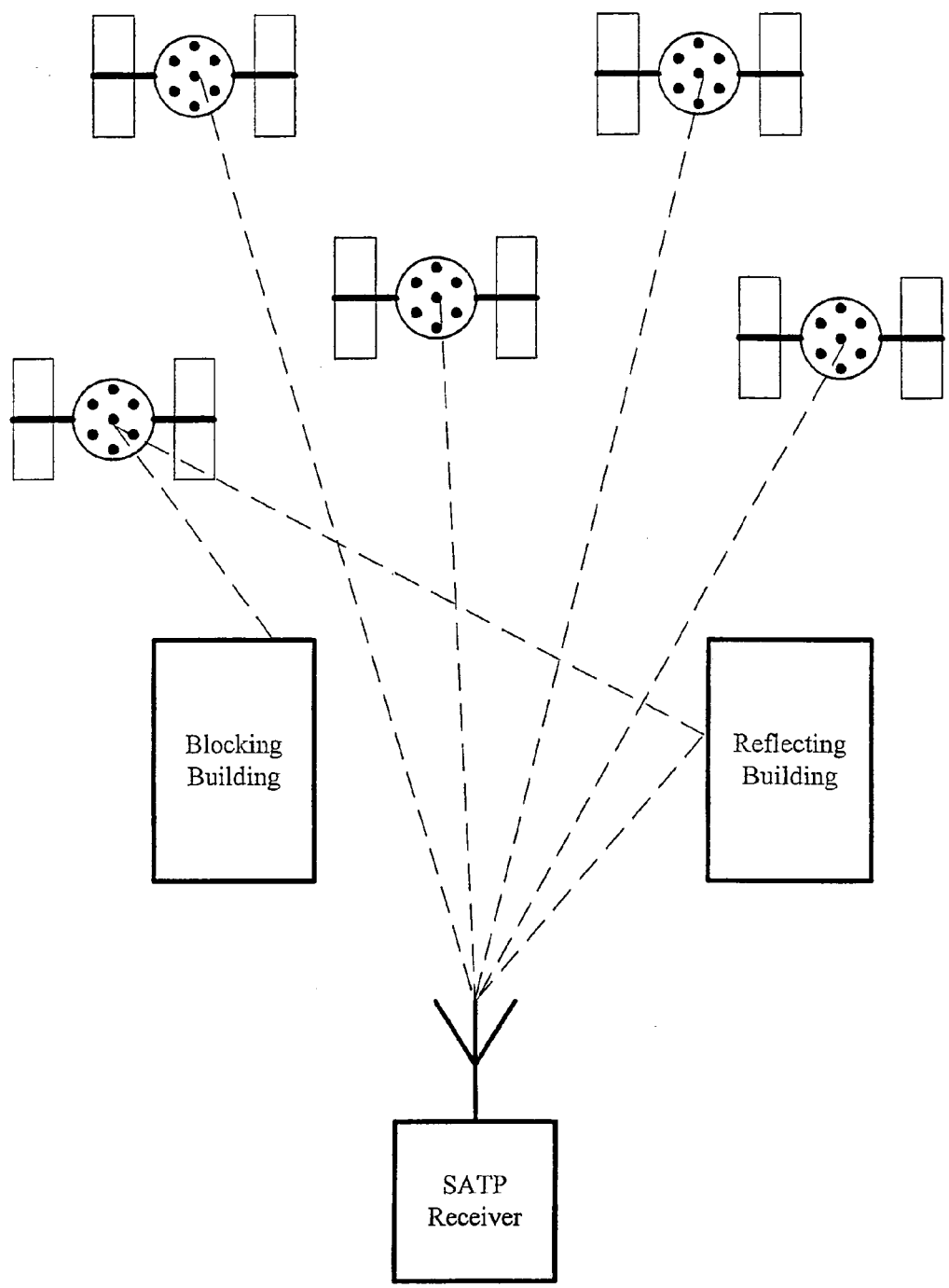
FIG. 2 is a diagram of a constellation of visible satellite positioning system spacecraft being tracked by a terrestrial used with a measurement corrupted by multipath in the so-called urban canyon environment.

The invention improves measurement fault detection by ordering the processing of measurements in order of increasing probability of a measurement fault, where we have some means to assess the relative likelihood of a fault on the measurements to be processed, other than the measurement residual itself. For example, suppose a set of pseudorange measurements is to be processed in a satellite positioning system receiver to obtain an estimate of the current position, as in FIG. 2. It appears in this Figure, and it is quite true that satellites at a low elevation angle as seen from the receiver are much more likely to have their transmitted signals affected by multipath and blockage for a terrestrial user. Thus we can say, without quantifying the exact probability of failure, that the lower elevation satellite has a higher probability of a multipath-induced fault on its pseudorange measurement than a higher elevation satellite.

Similarly, multipath corrupted measurements are typically observed to have a lower carrier to noise density ratio than uncorrupted measurements, and carrier tracking of a corrupted measurement may result in larger phase-errors at the output of the carrier tracking loop. Thus these two additional parameters, the $C/N_0$ of the measurement and the number and magnitude of the carrier tracking errors observed over some measurement interval are other indicators that may be used to order measurements for sequential processing with increasing measurement fault probability. These ordering elements could be used individually or in combination to determine the best processing order.

The key to the invention is to order the sequence of the measurements presented to the filter for processing so that those with a lower fault probability are processed first. This processing reduces the trace of the state error covariance matrix and increases the probability of fault-detection on subsequent measurements. This has not been recognized in the prior art, Chi-square measurement fault detection having introduced order-dependence into sequential Kalman filter measurement processing. Once we have a measurement with a fault, the measurement processing sequence is no longer irrelevant. This is demonstrated in another one-dimensional example in Table 5. Here we have a measurement with a fault, and the outcome of the processing cycle is highly-dependent on the order in which the measurements are processed. In this case, processing the measurements in the wrong order (B,A) results in two estimation system failures: first, the faulty measurement is not detected; and then, following the processing of the faulty measurement, a good measurement is rejected because of the damage done to the state estimate.

TABLE 5

Single State KF Sequential Measurement Processing with a Measurement Fault

| | | |
|---|---|---|
| Initial State | Truth: $X = 0$ Estimate: $X_{t|t-\Delta t}$ 32 1 | |
| Initial State Variance | $P_{t|t-\Delta t} = 1$ (state estimate error is correctly modeled) | |
| Measurement Model | $H_A = H_B = H = 1$ | |
| | $R_A = R_B = R = 1$ | |
| Measurements | $Z_A = -1$ (One sigma measurement, correctly modeled) | |
| | $Z_B = 5$ (Two sigma measurement – faulty) | |
| Measurement Processing Order | A, B | B, A |
| First Measurement Residual Variance | $\Gamma_A = 1 + 1 = 2$ | $\Gamma_B = 1 + 1 = 2$ |
| First Measurement Residual | $\delta_A = Z_A - X_{t|t-\Delta t} = -2$ | $\delta_B = Z_B - X_{t|t-\Delta t} = 4$ |
| First Measurement Three Sigma Chi-Square Test | $(-2)^2 < (3^2 \cdot 2)$ ? Passed | $(4)^2 < (3^2 \cdot 2)$ ? Passed |
| First Measurement Gain | $K_A = P_{t|t-\Delta t}/\Gamma_A = 1/2$ | $K_B = P_{t|t-\Delta t}/\Gamma_B = 1/2$ |
| First Measurement State Update | $X_{t|t-\Delta t,A} = X_{t|t-\Delta t} + K_A\delta_A = 0$ | $X_{t|t-\Delta t,B} = X_{t|t-\Delta t} + K_B\delta_B = 3$ |
| First Measurement State Variance Update | $P_{0|A} = (1 - K_A)P_0 = 1/2$ | $P_{0|B} = (1 - K_B)P_0 = 1/2$ |
| Second Measurement Residual Variance | $\Gamma_B = \frac{1}{2} + 1 = \frac{3}{2}$ | $\Gamma_A = \frac{1}{2} + 1 = \frac{3}{2}$ |
| Second Measurement Residual | $\delta_B = Z_B - X_{t|t-t,|A} = 5$ | $\delta_A = Z_A - X_{t|t-\Delta t,B} = -4$ |
| Second Measurement Three Sigma Chi-Square Test | $(5)^2 < \left(3^2 \cdot \frac{3}{2}\right)$ ? | $(-4)^2 < \left(3^2 \cdot \frac{3}{2}\right)$ ? |
| | Failed | Failed |
| Updated State Estimate | $X_{t|t} = 0$ | $X_{t|t} = 3$ |
| Second Estimate Error | 0 | 3 |

An example of the invention has been given for sequential measurement processing of measurements taken at a single time, however, the method can be extended. Suppose there are multiple measurements available, at different times, but all available prior to the next required reporting time for the state estimate. We can extend the concept of ordered measurement processing to measurements taken at different times by propagating the state and state error covariance estimates backwards and forwards in time to process the measurements with the lowest probability of a fault first. If, for example, we have a scalar measurement at time $t_1$ and a second measurement at a later time $t_2$, and we are not required to produce an updated state estimate until a third time, $t_3$. We can process these non-simultaneous measurements in order by increasing fault probability even if the measurement at the later time, t2, is the measurement with the lowest probability of a fault.

The steps required to process the non-simultaneous measurements are:
1. Record measurement 1 at time $t_1$.
2. Record measurement 2 at time $t_2$.
3. Sort the measurements in order of increasing fault probability, we'll assume for that the measurement with the lower fault probability is the measurement 2.
4. Propagate the state and covariance matrix forward from $t_0$ to time $t_2$
5. Process measurement 2, updating the state and covariance at time $t_2$
6. Propagate the state and covariance backwards in time to time $t_1$, noting that we subtract the relevant process noise matrix from the state error covariance matrix when propagating backwards.
7. Process measurement 1, updating the state and covariance at time $t_1$
8. Propagate the state and covariance forward from $t_1$ to the reporting time $t_3$.

CONCLUSION

A method of improving measurement fault detection using Chi-square residual test by ordering measurements for sequential processing by increasing probability of a measurement fault has been disclosed. A simple one-dimensional example of the efficacy of the method has been presented, and the application to ordering of measurements for processing in a satellite positioning system receiver has been presented.

In summary, the present invention provides a method for improving fault detection. The method comprises recording a plurality of measurements, each measurement having an associated measurement time, sorting the plurality of measurements, wherein the sort of the plurality of measurements is performed in order of increasing fault probability, propagating a state matrix and a covariance matrix forward from the first time to a time of the measurement having a lowest fault probability, processing the measurement having the lowest fault probability first, continuing processing until all measurements have been processed, and propagating the state matrix and the covariance matrix forward from a last measurement time to a reporting time. The processing comprises updating the state matrix and the covariance matrix at a time of the measurement having the lowest fault probability, and propagating the state matrix and the covariance matrix backwards in time to a time of a measurement with a next highest fault probability, if that time is earlier than the time of the measurement having the previous lowest fault probability, or forward in time if that time is later.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims appended hereto.

What is claimed is:

1. A measurement fault detection system in a sequential measurement processing estimator, the measurement fault detection system comprising:
   a plurality of measurements, each measurement having an associated measurement time;
   a sorter that sorts the plurality of measurements in order of increasing fault probability;
   a variable-gain filter in signal communication with the sorter;
   an estimate of each of the plurality of measurements generated by the variable-gain filter, wherein each estimate includes a state matrix and a covariance matrix propagated forward or backward in time from the time of the measurement with a next lowest fault probability in response to the time of the measurement with the next lowest fault probability being earlier or later, respectively, than the time of the measurement for which the estimate is then being generated; and
   a state matrix and a covariance matrix propagated forward from the time of the measurement with a highest fault probability to a reporting time.

2. The measurement fault detection system of claim 1, wherein the variable-gain filter is a Kalman filter.

3. The measurement fault detection system of claim 2, wherein the plurality of measurements is received at a Global Positioning System (GPS) receiver.

4. The measurement fault detection system of claim 1, wherein the measurements are non-simultaneous.

5. An apparatus for measuring fault detection, the apparatus comprising:
   means for recording a plurality of measurements, each measurement having an associated measurement time;
   means for sorting the plurality of measurements, wherein the sort of the plurality of measurements is performed in order of increasing fault probability;
   means for propagating a state matrix and a covariance matrix forward from a first time to the time of the measurement having a lowest fault probability;
   means for processing the measurement having the lowest fault probability first, wherein the processing comprises:
      means for updating the state matrix and the covariance matrix at the time of the measurement having the lowest fault probability; and
      means for propagating the state matrix and the covariance matrix backwards or forwards in time to the time of the measurement with a next highest fault probability in response to the time of the measurement with the next highest fault probability being earlier or later, respectively, than the time of the measurement with a then lowest fault probability;
   means for continuing processing until all measurements have been processed; and
   means for propagating the state matrix and the covariance matrix forward from the time of the measurement with a highest fault probability to a reporting time.

6. The apparatus of claim 5, wherein the apparatus is operatively connected to a Global Positioning System (GPS) receiver.

7. The apparatus of claim 6, wherein the means for propagating the state matrix and covariance matrix backwards in time further includes means for subtracting a process noise matrix from a state error covariance matrix.

8. The apparatus of claim 7, wherein the measurements are non-simultaneous.

9. A machine-readable medium that contains instructions for implementing a method of fault detection, the instructions implementing the method steps comprising:
   recording a plurality of measurements, each measurement having an associated measurement time;

sorting the plurality of measurements, wherein the sort of the plurality of measurements is performed in order of increasing fault probability;

propagating a state matrix and a covariance matrix forward from a first time to the time of the measurement having a lowest fault probability;

processing the measurement having the lowest fault probability first, wherein the processing comprises:

updating the state matrix and the covariance matrix at the time of the measurement having the lowest fault probability; and propagating the state matrix and the covariance matrix backwards or forwards in time to the time of the measurement with a next highest fault probability in response to the time of the measurement with the next highest fault probability being earlier or later, respectively, than the time of the measurement with a then lowest fault probability;

continuing processing until all measurements have been processed; and propagating the state matrix and the covariance matrix forward from the time of the measurement with a highest fault probability to a reporting time.

10. The machine-readable medium that contains instructions for implementing a method of fault detection of claim 9, wherein the machine-readable medium is operatively connected to a Global Positioning System (GPS) receiver.

11. The machine-readable medium that contains instructions for implementing a method of fault detection of claim 10, wherein the method step of propagating the state matrix and covariance matrix backwards in time further includes subtracting a process noise matrix from a state error covariance matrix.

12. The machine-readable medium that contains instructions for implementing a method of fault detection of claim 11, wherein the measurements are non-simultaneous.

* * * * *